United States Patent [19]

Rao et al.

[11] 4,456,579

[45] Jun. 26, 1984

[54] LOW ANTIMONY LEAD-BASED ALLOY AND METHOD

[75] Inventors: Purushothama Rao, Eagan; Wendy J. Nelson, Cloquet, both of Minn.

[73] Assignee: GNB Batteries Inc., Mendota Heights, Minn.

[21] Appl. No.: 431,950

[22] Filed: Sep. 30, 1982

[51] Int. Cl.³ ............................................ C22B 11/10
[52] U.S. Cl. ................................... 420/566; 164/479; 429/226
[58] Field of Search ................ 164/479; 420/566, 565, 420/564; 429/226

[56] References Cited

U.S. PATENT DOCUMENTS 4,349,067  9/1982  Wirtz et al. ........................ 164/429

FOREIGN PATENT DOCUMENTS 2826590  1/1980  Fed. Rep. of Germany ...... 420/566

Primary Examiner—M. J. Andrews
Attorney, Agent, or Firm—Augustus J. Hipp

[57] ABSTRACT

A lead-based alloy containing, based upon the total weight of the alloy, 0.8–1.6% antimony, 0.08–0.16% arsenic, 0.006–0.012% silver and, optionally, 0.2–0.5% tin, is disclosed for making lead-acid battery grids using a continuous casting process.

16 Claims, 3 Drawing Figures

LOW ANTIMONY LEAD-BASED ALLOY AND METHOD

RELATED APPLICATIONS

Rao and Trenter, Ser. No. 181,335, filed Aug. 26, 1980, for: Low Antimony Lead-Based Alloys and Use Thereof; a continuation-in-part of Ser. No. 72,752, filed Sep. 5, 1979.

Klang and Rao, Ser. No. 352,924, filed Feb. 26, 1982, for: Lead-Acid Battery and Method of Making Same; a continuation-in-part of Ser. No. 245,772, filed: Mar. 20, 1981.

The present invention relates to lead-acid batteries, and, more particularly, to a grid alloy compatible with continuous grid casting processes and which likewise provides grids useful in maintenance-free batteries.

For many years, lead-based alloys containing about 4.5%–12% antimony were used for the preparation of lead-acid battery grids. The principal function of the antimony constituent in such alloys is to afford adequate grid strength to permit satisfactory casting and processing of the formed grids. Lithium and combinations of lithium and tin have likewise been employed as is shown in U.S. Pat. No. 3,647,545.

In recent years, considerable emphasis has centered on the preparation of maintenance-free, lead-acid batteries. These batteries require no servicing or water additions throughout the life of the battery and are typically provided in sealed or substantially sealed condition since there is no need to have access to the interior of the battery after assembly has been completed. To achieve this maintenance-free objective, substantial reduction of water losses must be achieved. This requires that the grids employed in the maintenance-free battery have the effect of reducing the current draw at a fixed over-charge voltage so that only a minimum of gas is generated and the water loss accompanying gassing is concomitantly minimized. With antimony-lead grids containing about 4.5% by weight antimony, the current draw at the completion of charging is unacceptably high for maintenance-free battery applications. In addition, it is known that self-discharge of a wet lead-acid battery employing an antimony alloy is caused primarily by the dissolution of antimony from the positive grids and its subsequent deposition of the negative plates, where it causes electrochemical reactions that discharge the active lead to lead sulphate. For these reasons, the development of suitable materials for grids in maintenance-free batteries has primarily emphasized the use of lead-based alloys containing no antimony or a reduced level of antimony.

However, when antimony is the only alloying constituent used in a lead-based alloy, it generally becomes impractical to reduce the antimony level significantly below the 4.5% level, due to a tendency of grids cast from such low antimony, lead-based alloys to crack. The cracking phenomenon has been avoided in low antimony alloys, however, by use of lead-based alloys containing other alloying constituents in addition to antimony.

Mao and Lannoye, U.S. patent application Ser. No. 878,882, filed on Feb. 17, 1978, for: Cadmium-Antimony-Lead-Alloy for Maintenance-Free Lead-Acid Battery describes an alloy that has a reduced antimony content and is suitable for forming the grids of maintenance-free batteries. The lead-based alloys disclose therein contain from about 1.0 to about 1.9 wt. % antimony and from about 1.2 to about 2.0 wt. % cadmium, the cadmium being present in an amount at least equal to the antimony present. The addition of cadmium avoids the cracking phenomenon, and the resulting alloy provides superior grids for maintenance-free batteries. However, the toxicity of cadmium necessitates special handling precautions.

Still further, a number of patents suggest the use of lead-based, low antimony alloys containing selenium for grain refinement as well as several other alloying ingredients. These patents include the following: Great Britain No. 622,512; U.S. Pat. No. 3,801,310; U.S. Pat. No. 3,879,217; U.S. Pat. No. 3,912,537; U.S. Pat. No. 3,933,480 and U.S. Pat. No. 3,990,893. The amounts of selenium set forth vary significantly as do the levels of the other alloying ingredients proposed.

These low antimony, selenium, lead-based alloys require an alloying ingredient to provide the requisite strength characteristics (including instantaneous handling strength); and minor amounts of arsenic are employed for this purpose in several of the cited patents. Unfortunately, achievement of the requisite strength characteristics in this fashion is attained at the expense of the desired ductility. The use of arsenic in such alloys in the levels suggested thus results in grids which are too brittle to allow easy handling of the grids in further processing. This is particularly significant in direct gravity casting applications when either relatively thicker grids are needed or where the grid configuration involves the intersection of bars or wires of differing cross-sections. At such intersections, the susceptibility to breaks due to excessive brittleness is increased. Also, the presence of arsenic above critical limits in such alloys can detract from the characteristics desired for maintenance-free applications.

Three of the cited patents further suggest, as an optional alloying ingredient, the inclusion of silver in a level of from 0.025 to 0.1 wt. %. Silver addition is said to stabilize the fine structure of such alloys and to improve corrosion resistance. Such addition is also desirable for batteries subject to relatively rigid requirements with respect to mechanical strength, ductility and electrochemical behavior of the grid alloys.

However, the inclusion of silver in such levels increases the alloy cost, which may be significant. Moreover, and importantly, such silver levels appear to detract from the characteristics required for maintenance-free applications.

The co-pending Rao et al. application identified herein discloses low antimony, selenium, lead-based alloys which can be formed into battery grids having exceptional properties by minimizing the arsenic content of such alloys and adding a relatively low level of silver. Such alloys can be easily cast by direct gravity casting techniques at commercially acceptable rates, yet provide grids with superior ductility characteristics. Moreoever, grids formed from such alloys exhibit reduced gassing and water loss characteristics in comparison to other alloys of this general type.

Battery grids are presently manufactured for the most part by either direct gravity casting (e.g.-filling a mold which may comprise a grid pair with the molten alloy and allowing the alloy to cool and solidify and finally ejecting the completely solidified grids) or expanded metal techniques (e.g. - taking a continuous strip of the grid alloy and reticulating to provide the desired open pattern by mechanically working and the like). Gravity casting into a pair of molds is a discontinuous operation in that each grid pair is cast independently. The mold closes to accept the molten alloy and opens to eject each solidified grid pair. This method is the principal one presently in use in the industry.

However, over the years, attempts have been made to provide a method by which battery grids could be continuously cast. Such a continuous process could provide substantially increased productivity as well as other manufacturing benefits. More particularly, the production capability achieved with a single continuous casting machine should be equivalent to that of some 10 or more presently used direct gravity casting machines. Accordingly, labor costs and floor space requirements should be capable of being substantially reduced with continuous casting machines. Further, electrical energy costs to produce a given volume of grids with a continuous casting process should be significantly lower than what is required by present gravity casting techniques. Also, it is believed that a continuous casting machine should provide a more desired work environment due to less heat and other pollution in relation to present gravity casting machines.

Recently, Wirtz Manufacturing Company has made commercially available an apparatus for continuously casting battery grids. In general, this apparatus includes a rotating hollow drum having on its periphery the desired grid configuration which cooperates with a shoe also having part of the desired grid configuration to form the "mold". In operation, molten alloy is continuously pumped through the shoe to the mold as the drum is being rotated. A continuous strip having the desired grid pattern emerges from the mold and is removed from the drum. This strip may then be rolled up until used or otherwise processed as desired.

It is believed that the subject apparatus was developed utilizing calcium-tin-lead alloys of compositions useful for maintenance-free battery applications. With such types of alloys, grids can be formed at rates up to about 175 to 200 feet per minute.

However, despite the conceptual advantages of a continuous grid casting process, the process requires several diverse parameters to be maintained to successfully provide such advantages in commercial situations. First of all, the alloy utilized must have flow capabilities such that the "mold" is satisfactorily filled during the residence time afforded. Likewise, the process requires that entry of the molten alloy into the intricate but small wire cross-sections of the grid wires in the mold section not be blocked to any significant extent due to the presence of dross, solidified second phase or whatever. Stated another way, the process requires free flow of the molten alloy throughout the mold and shoe. Accordingly, the alloy employed must use alloying ingredients at levels which are soluble in the molten alloy at the temperatures used in the continuous casting. Thus, if alloying ingredients are used in amounts such that at the operating temperatures solid components precipitate out, then the precipitated solid constituent interferes with the free flow of the molten alloy into the mold or grid cavity, also leading to embrittlement of the resulting grids due to lack of adequate grain to grain cohesion between adjacent grains when once solidification process is completed.

Still further, the continuous casting process necessitates the use of an alloy having a relatively narrow liquidus-solidus temperature range or an alloy that solidifies at a fixed temperature, as in the case of a pure metal or an alloy of a eutectic composition. More particularly, such temperature range must be sufficiently narrow so that the alloy is adequately solidified upon leaving the mold section so that the proper grid shape will be maintained, but at the same time not solidified to the point that a homogeneous, continuous strip is formed not having adequate grain-to-adjacent grain cohesion. Stated another way, as to the latter requirement, as the formed grid strip leaves the mold section, another section joins with the previously formed strip; and, at the juncture, the strip leaving the mold must have sufficient liquidity so that the portion being molded will join therewith without any significant discontinuities or voids along adjoining grains and subgrains. It will generally be satisfactory when such temperature range is no greater than 50° F. or so, perhaps 55° to 60° F.

Lastly, the alloy composition must provide a grid strip having a proper balance between the handling strength and the ductility. Thus, the continuous grid strip must have sufficient ductility so that it will not break or otherwise disrupt the process, yet the strip must have adequate strength to allow the strip to be pulled off of the casting drum without any undue stretching or extension. In other words, if the formed strip has inadequate strength, the removal of the strip from the drum can result in sufficient elongation so that the grids, upon separation, may not have the desired length and width dimensions.

These requirements are such that some of the prior low antimony alloys that had been advantageously employed for making grids for maintenance-free applications by gravity casting techniques cannot be processed at satisfactory speeds in commercial applications in the continuous casting techniques described herein. Specifically, it has been found that low antimony alloys containing conventional grain refiners such as selenium, copper, sulfur and the like cannot be satisfactorily continuously cast into grids under desired operating conditions.

It is accordingly an object of the present invention to provide a low antimony, lead-based alloy that can be continuously cast into lead-acid storage battery grids under commercially acceptable conditions, yet possesses desirable electrochemical characteristics.

A further object of the invention provides an alloy suitable for making grids for maintenance-free battery applications.

Other objects and advantages will become apparent from the following description of the invention and from the accompanying drawings, in which.

While the invention will be described in connection with certain preferred embodiments, it will be understood that it is not intended to limit the invention to these embodiments. On the contrary, it is intended to cover all embodiments, modifications and equivalents as can be included within the spirit and scope of the invention as defined in the appended claims. Thus, as an example, while the present invention will be primarily described in conjunction with maintenance-free applications, the invention is certainly not so limited. The alloys disclosed herein may thus certainly be employed for any lead-acid battery application. Further, while the alloys of this invention may be advantageously utilized in the continuous grid casting process involved in the Wirtz continuous casting machine illustrated and described herein, it should be appreciated that the alloys of this invention may be employed in any continuous casting process having similar processing requirements. Lastly, the particular grid configuration shown is only illustrative; the grid configuration can vary as desired.

The present invention, is, in general, predicated on the discovery that low antimony, lead-based alloys having acceptable electrochemical properties can be continuously processed into battery grids by eliminating certain alloying ingredients often used in making grids by gravity casting and by maintaining the level of the alloying ingredients employed within well defined levels.

In general, the alloy compositions of this invention comprise a lead-based alloy including, as alloying ingredients, from about 0.8 to about 1.6% antimony, from about 0.08 to about 0.16% arsenic and from about 0.006 to about 0.012% silver, all percentages being based upon the total weight of the alloy. Desirably, the alloys of this invention can include as an optional ingredient from about 0.2 to about 0.5% tin, based upon the total weight of the alloy.

It has been found that such alloys satisfy the several diverse requirements of a continuous casting process as described herein and allow production rates considered commercially acceptable. Such alloys thus allow processing at speeds ranging from about 75 up to about 150 feet per minute.

Figure 1:
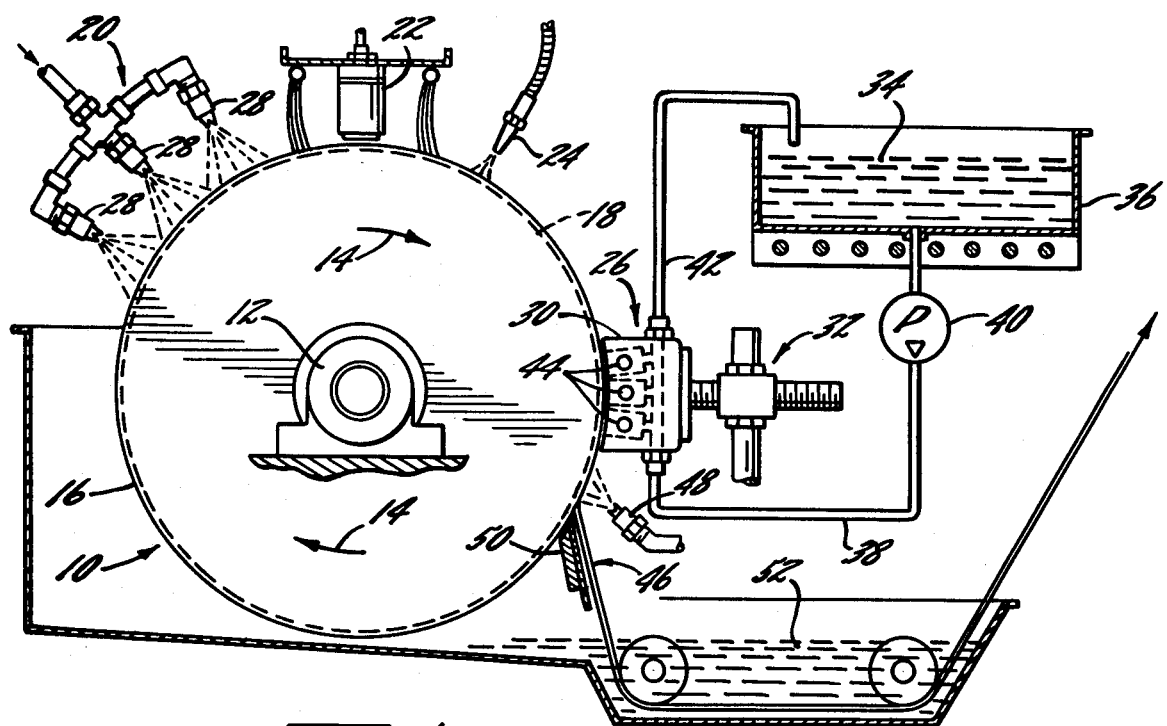
FIG. 1 is a schematic view of the Wirtz continuous casting apparatus which may be employed to make battery grids utilizing the alloys of the present invention.
Figure 2:
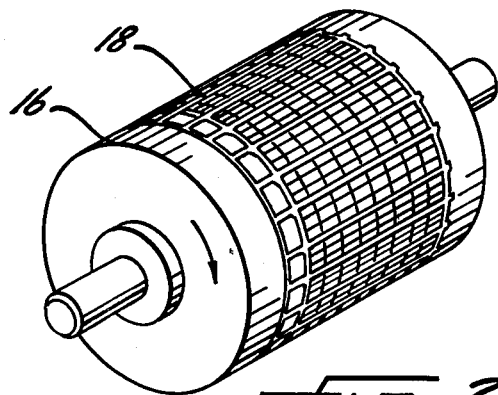
FIG. 2 is a perspective view of the drum used in the continuous casting apparatus and illustrating the grid configuration on its periphery.

Turning now to the illustrative apparatus, a drum 10, mounted as shown at 12 is continuously rotated (by means not shown) in the direction, shown by arrows 14. The periphery 16 of drum 10 contains the desired configuration of the grids, as illustrated generally at 18 (as best seen in FIG. 2). As drum 10 rotates, it passes sequentially through an optional cooling station 20, a temperature sensor 22, a lubricating station 24 and into the mold, shown generally at 26.

The lubricating station 24 provides a coating for the drum periphery which minimizes wear on the mold surfaces as well as galling. Any of a variety of mold release agents or the like may be used. Thus, various vegetable oils may be suitably used. As one example, peanut oil is satisfactory.

Drum 10 is provided with internal cooling means (not shown) to maintain its periphery at generally ambient conditions. However, if temperature sensor 22 indicates a higher surface temperature than desired, the optional cooling station 20 can provide supplemental cooling, via nozzles 28 which are adapted to spray water onto the drum surface. Many suitable temperature sensors are known.

The mold, shown generally at 26, is formed by a shoe 30 (also having the grid configuration) and the portion of the periphery 16 of the drum 10 which is adjacent shoe 30. Proper adjustment of shoe 30 relative to the drum periphery can be provided by suitable adjustment means, shown generally at 32.

Molten alloy is continuously transported across the cavity of mold 26 to form the continuous strip in the desired grid configuration. To this end, molten alloy 34 is transported from reservoir 36 via line 38 by pump 40 to one side of shoe 30. Excess alloy exits the other side of the shoe 30 and returns to reservoir 36 via line 42. Heaters 44 may be used to maintain the molten alloy at the desired temperature as it enters the cavity of mold 26. In this connection, it will be suitable to maintain the molten alloy at a casting temperature in the range of about 690° to about 720° F.

The continuous grid strip 46 exiting mold 26 is then cooled to provide further solidification and to increase the handling strength. Suitable cooling may be effected by spraying water at ambient temperature conditions via nozzle 48 onto strip 44.

Removal of continuous strip 46 from the drum periphery 16 is then effected. This is facilitated by a doctor blade 50. Further cooling is then provided by passing strip 46 through a water cooling bath 52, maintained at ambient conditions. The cooled, continuous grid strip may then be rolled up pending either use or further processed as desired.

Figure 3:
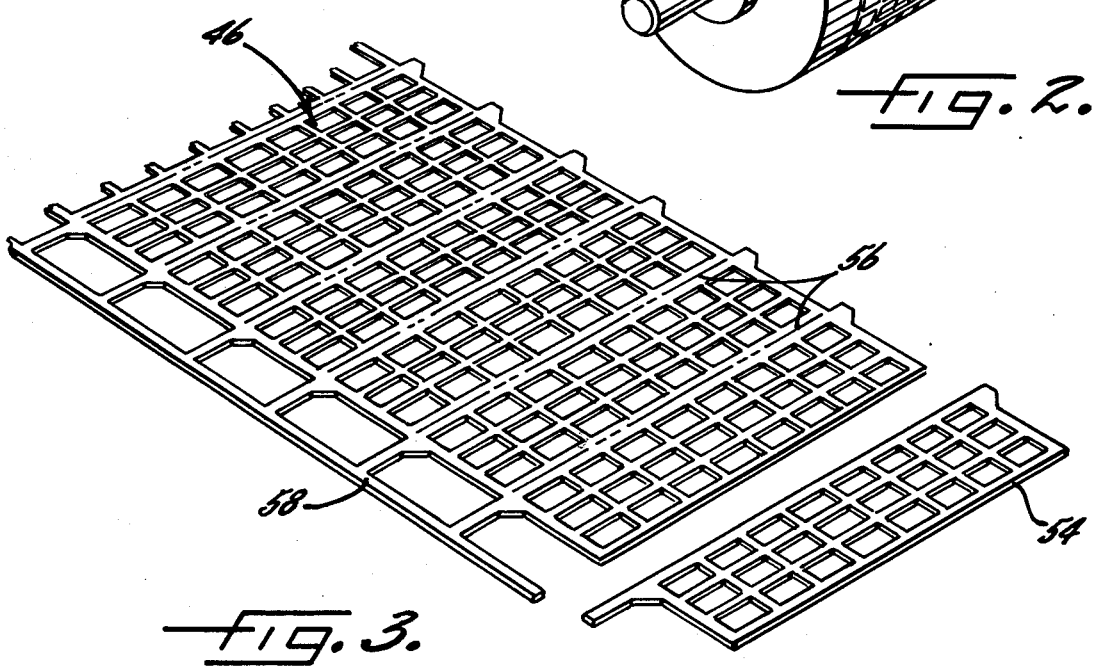
FIG. 3 is a perspective view of the continuous strip which results from employing the apparatus shown in FIG. 1, a single grid having been broken away from the strip to illustrate the configuration of the grid in the exemplary embodiment.

FIG. 3 illustrates the exemplary continuous grid strip 46. An individual grid 54 can be separated from strip 46 by severing along line 56 and removing longitudinal support strip 58.

The exemplary grid illustrated is particularly suitable for use in the batteries shown in the copending Klang et al application identified herein. However, as may be appreciated, the process illustrated may be used with any desired grid configuration. Similarly, the grid thickness may be varied as desired. For many applications, as an example, grid thickness in the 40 to 65 mils range will be satisfactory.

To obtain the desired casting speeds as previously described yet provide a grid having satisfactory properties, it is necessary to maintain the alloying ingredients within the ranges specified herein. With regard to the antimony content, levels above about 1.6 wt. % antimony unduly increase the solidification range to the point that continuous casting speeds are drastically reduced and grid cracking can also result. Antimony contents below about 0.8 wt. % exhibit inferior electrochemical characteristics when used for battery grids.

The inclusion of arsenic as an alloying ingredient is believed to contribute to the desired handling strength characteristics. It will generally be undesirable to utilize excessive amounts of arsenic due to unsatisfactory brittleness observed immediately after casting as well upon overaging, interference with the desired grain refinement, as well as an increased tendency for interdenritic voids to develop during the process of grid solidification.

With respect to the silver constituent, this alloying ingredient is believed to provide improved positive grid corrosion resistance as well as adequate refining of the microstructure. It is further believed that the presence of silver imparts a tolerance for the arsenic levels employed, providing an alloy having the desired balance between its strength and handling characteristics. Levels of silver below those defined herein tend to result in the presence of undesirable interdendritic voids. On the other hand, excessive silver levels tend to result in greater gassing in service, impairing to some extent the otherwise desirable maintenance-free characteristics of such alloys.

It is also preferred to utilize tin as an alloying ingredient at the levels hereinbefore discussed. The presence or absence of tin may not significantly affect the continuous casting characteristics of the alloys of this invention; but, depending upon how promptly the battery will be manufactured and put into use, the presence of tin may be desirable. Thus, from the electrochemical standpoint, it appears desirable to include tin in the alloy to provide satisfactory charge acceptance as well as satisfactorily low internal resistance, particularly in situations where a significant time period elapses between the casting of the grid and either the manufacturing of the battery or the placing of the battery into service.

It should be appreciated that commercial grades of lead for battery manufacturing, and perhaps other of the alloying ingredients used, may contain minor amounts of silver; and this should be taken into account in determining the level of silver desired. Typically, the silver level as an impurity in battery grade lead will be about 0.003% or less, based upon the weight of the resulting alloy. This fortuitous circumstance serves to decrease the cost premium necessary due to the inclusion of silver. In similar fashion, the impurity levels should accordingly be taken into account in determining the levels of the other alloying ingredients employed.

Further, alloys prepared in accordance with the present invention can contain impurities in amounts typically present in commercially available battery grade lead. Additional impurities may also be present in the alloy as a result of impurities typically present in the antimony and other alloying constituents. Further, additional ingredients can be intentionally added to the alloy of the present invention, so long as such ingredients do not significantly and adversely affect either the continuous casting process involved or the desirable characteristics or features attributable to the grids formed.

In accordance with one aspect of the present invention, it has been found that the desirable continuous casting alloys of the present invention should not contain any significant amounts of conventional grain-refining, alloying ingredients such as, for example, sulfur, selenium and copper. The presence of such grain-refining ingredients in excessive levels thus adversely affects the continuous casting process described herein, typically resulting in precipitates that impair the necessary free flow of the molten alloy as has been previously described. It is thus preferred to provide alloys which contain, based upon the total weight of the alloy, no more than about, as a maximum, 0.05% copper, 0.0005% selenium and 0.0005% sulfur.

Despite the absence of the amounts of such grain-refining constituents generally considered necessary in this type of alloy, it has been found that the resulting grids have satisfactory grain refinement. Indeed, the continously cast grids of the present invention possess grain refinement considered comparable to the grain refinement obtained when similar alloys containing typical levels of such grain-refiners are gravity cast into grids. It is believed that in some fashion the relatively rapid solidification involved in the continuous casting process described herein imparts satisfactory grain refinement to the cast grid which is not generally achieved in gravity casting techniques where the solidification occurs much slower.

The preferred composition includes, based upon the total weight of the alloy, about: 1.0 to 1.3% antimony, 0.09 to 0.15% arsenic, 0.008 to 0.012% silver, and, when used, 0.25 to 0.4% tin. It is also preferred to maintain the following impurities at or below the levels set forth:

| Constituent | Range In Composition - % |
|---|---|
| Nickel | 0.0006 |
| Tellurium | 0.0006 |
| (Combined maximum of Nickel and Tellurium) | 0.001 |
| Iron | 0.002 maximum |
| Cadmium | 0.001 maximum |
| Zinc | 0.0008 maximum |
| Manganese | 0.0002 maximum |
| Bismuth | 0.03 maximum |
| Cobalt | 0.0001 maximum |
| Platinum | 0.00001 maximum |
| Mercury | non-detected spectrographically |

The alloys described herein may be produced using conventional techniques. Thus, thealloys may be prepared by adding the alloying ingredients to molten lead and mixing until the mass is homogeneous.

In some applications, it may be desired to use both positive and negative grids formed from the alloys described herein. Other applications may make it suitable to form only some of the grids from such alloys. As an example, in particularly rigorous maintenance-free applications, it may be desirable to form only the positive grids from the alloys of this invention. The negative grids may employ any non-antimony alloy useful for maintenance-free applications, calcium-tin-lead alloys being preferred. Such alloys may suitably contain 0.1 to 0.4 wt. % tin with from about 0.06 up to about 0.15 or 0.20 wt. % calcium. Satisfactory alloys are disclosed in Mao and Rao, Ser. No. 927,232 filed July 24, 1978, for: "Lead Base Calcium-Tin Alloy And Use Thereof."

It has been found that the alloys of the present invention satisfy the several diverse requirements of continuous grid casting. Continuous grid strips of satisfactory electrochemical properties can be provided at speeds of from about 75 to about 150 feet per minute or so. The resulting continuous strips can then be separated into the respective grids and will provide properties satisfactory for maintenance-free applications.

We claim as our invention:

1. In a method of casting a continuous strip of battery grids which comprises rotating an arcuate surface having the desired grid pattern thereon, forming a mold at one section of the arcuate surface, filling said mold with a molten alloy to continuously form a strip and thereafter removing said strip from said arcuate surface, the improvement wherein said molten alloy is a lead-based alloy consisting essentially of:

from about 0.8 to about 1.6 wt. % antimony;
from about 0.08 to about 0.16 wt. % arsenic;
from about 0.006 to about 0.012 wt. % silver;
and the balance lead.

2. The method of claim 1 wherein said alloy includes from about 0.2 to about 0.5% tin, based upon the total weight of the alloy.

3. The method of claim 1 wherein said alloy contains from about 1.0 to 1.3% antimony.

4. The method of claim 1 wherein said alloy contains from about 0.09 to 0.15% arsenic.

5. The method of claim 1 wherein said alloy contains from about 0.008 to 0.012% silver.

6. The method of claim 1 wherein said alloy includes from about 0.25 to 0.4% tin, based upon the total weight of the alloy.

7. The method of claim 1 wherein said alloy contains from about 1.0 to 1.3% antimony, from about 0.09 to 0.15% arsenic and from about 0.008 to 0.012% silver.

8. The method of claim 7 wherein said alloy includes from about 0.25 to 0.4% tin, based upon the total weight of the alloy.

9. A lead-based alloy consisting essentially of:
from about 0.8 to about 1.6 wt. % antimony;
from about 0.08 to about 0.16 wt. % arsenic;
from about 0.006 to about 0.012 wt. % silver;
and the balance lead.

10. The alloy of claim 9 which includes from about 0.2 to about 0.5% tin, based upon the total weight of the alloy.

11. The alloy of claim 9 which contains from about 1.0 to 1.3% antimony.

12. The alloy of claim 9 which contains from about 0.09 to 0.15% arsenic.

13. The alloy of claim 9 which contains from about 0.008 to 0.012% silver.

14. The alloy of claim 9 which includes from about 0.25 to 0.4% tin, based upon the total weight of the alloy.

15. The alloy of claim 9 which contains from about 1.0 to 1.3% antimony, from about 0.09 to 0.15% arsenic and from about 0.008 to 0.012% silver.

16. The alloy of claim 15 which includes from about 0.25 to 0.4% tin, based upon the total weight of the alloy.

* * * * *